United States Patent Office 3,817,784

Patented June 18, 1974

3,817,784

PROCESS FOR COATING SUBSTRATES WITH COPPER BY THERMAL DECOMPOSITION OF SELECTED FLUOROORGANOCOPPER (I) COMPOUNDS

Allan Cairncross and William Arthur Sheppard, Wilmington, Del., assignors to E. I. du Pont de Nemours and Company, Wilmington, Del.

No Drawing. Application Dec. 2, 1970, Ser. No. 102,569, now Patent No. 3,700,693, which is a continuation-in-part of application Ser. No. 725,541, Apr. 30, 1968, which in turn is a continuation-in-part of application Ser. No. 557,605, June 15, 1966, both now abandoned. Divided and this application May 9, 1972, Ser. No. 251,655

Int. Cl. B44d *1/02*

U.S. Cl. 117—227 8 Claims

ABSTRACT OF THE DISCLOSURE

A process for copper-coating various substrates and a description of the substrates that are coated. The process comprises selected fluoroorganocopper compositions at preferred temperatures of about −20° C. to 350° C. The copper coatings are electrical conductors and useful, for instance, in printed electrical circuits.

CROSS-REFERENCE TO RELATED APPLICATIONS

This application is a division of copending application Ser. No. 102,569, filed Dec. 2, 1970, now U.S. Pat. No. 3,700,693, as a continuation-in-part of its copending application Ser. No. 725,541, now abandoned, filed Apr. 30, 1968, as a continuation-in-part of its copending application Ser. No. 557,605, filed June 15, 1966, and now abandoned.

BACKGROUND AND SUMMARY OF THE INVENTION

The process for preparing the fluoroorganocopper compositions useful herein comprises reacting a fluoro compound, $R_fQ$, with a copper-containing compound such as cuprous bromide, cuprous chloride, cuprous iodide, cuprous thiocyanate, and $(R_f{-}Cu)_x\cdot(\text{dioxane})_y$, in an inert, anhydrous, aprotic solvent. $R_f$ is as described in the formula set out hereafter, Q is chlorine, bromine, iodine, M, or MX, where M is a metal having atomic number 3, 11, 12, 13, 19, 20, 30, 31, 37, 38, 48, 49, 55, 56 or 82, and X is chlorine, bromine or iodine.

The preparation of the fluoroorganocopper compositions useful herein, is more fully described in parent application, U.S. Ser. No. 102,569, now U.S. 3,700,693. Said application is incorporated herein by reference to the extent necessary to augment the description of the preparation of said compositions. The fluoroorganocopper compounds, complexes and solutions thereof referred to herein as "compositions" are claimed in the parent case.

The compositions useful in the process of this invention are (1) compounds and complexes of the formula $$(R_f{-}Cu)_x\cdot(\text{dioxane})_y$$

wherein $R_f$ is a fluorinated monovalent hydrocarbyl radical containing up to 12 carbons selected from the group consisting of

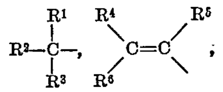

and Ar— wherein $R^1$ and $R^2$ can be the same or different and are seselected from the group consisting of hydrogen, perfluoroalkyl, fluoroaryl, and (perfluoroalkyl) aryl;

$R^3$ is selected from the group consisting of hydrogen, perfluoroalkyl, fluoroaryl, (perfluoroalkyl)aryl, and carbalkoxy provided at least one of $R^1$, $R^2$ and $R^3$ contains fluorine;

$R^4$, $R^5$ and $R^6$ can be the same or different and are fluoroalkyl;

Ar is selected from the group consisting of fluoroaryl, (fluoroalkyl)aryl, and (perfluoroalkoxy) aryl;

$x$ is an integer from 1 to 4; and $y$ is 0, ½, 1, 2, or 3;

and (2) solutions thereof in inert, aprotic solvents.

The novel process comprises contacting the surface of a substrate to be copper-coated, with a fluoroorganocopper compound, a complex thereof with dioxane, or with solutions of one or more of said compositions in inert, aprotic solvents.

DETAILS OF THE INVENTION

The fluoroorganocopper compositions useful herein contain at least one atom of combined fluorine per atom of copper. This quantity of fluorine and copper is expressed as an atomic ratio of fluorine to copper of at least 1:1. Preferably the fluoroorganocopper compounds have an atomic ratio of fluorine to copper of 3:1 or higher. For example, pentafluorophenylcopper has a fluorine to copper ratio of 5:1. The complexes comprise the reaction product of a fluoroorganocopper compound and 1,4-dioxane.

The fluoroorganocopper compositions are soluble in inert, aprotic solvents. Such solvents include ethyl ether, butyl ether, phenyl ether, hexene, benzene, toluene, pentene, 1,2-dimethoxyethane, 2-methoxyethyl ether; alkyl alkanoates of up to 8 carbons such as ethyl acetate, methyl isobutyrate, isobutyl butyrate, and ethyl valerate; N,N-dialkylamides of alkanoic acids containing a total of up to 8 carbons such as dimethylacetamide, diethylpropionamide and diethylisobutyramide; and mixtures thereof.

The fluoroorganocopper compositions, like other organocoppers, are easily hydrolyzed and solvents used for the preparation of solutions are preferably anhydrous.

For best results in the coating operation, the surface of the substrate is cleaned and dried before contact with the fluoroorganocopper composition. The substrate is then immersed in or otherwise contacted with the fluoroorganocopper composition. It is preferred, in the practice of this invention, to deposit copper from solutions of the fluoroorganocopper compounds and complexes although melts and vapors can be employed.

In one method for practicing this invention, the substrate is immersed ("solution process") in a fluoroorganocopper coating solution. In another method ("ink process") the substrate is coated with the solution and the solvent is allowed to evaporate.

Preferred contact temperatures are between about −20° to 350° C. It is especially preferred that the contact temperature be maintained between about 10° C. to 225° C. It is noted, however, that higher temperatures than about 350° C. are also operable. For instance, on such substrates as ceramics, hard glass, and other mineral compositions, temperatures of up to 2000° C. can be used. An important proviso is that the time of heating be very short, possibly even less than a millisecond. One example of a suitable heat source would be a photoflash lamp or similar device.

The time required to produce the copper coating is dependent upon the fluoroorganocopper composition used, the process temperature and whether cosolvents are present. In general, the time required for the nearly complete decomposition of the fluoroorganocopper composition may vary from a few minutes to hours or days.

Heat may be applied under an inert atmosphere such as nitrogen, helium and the like, to decompose the fluoroorganocopper composition with the deposition of copper metal in the form of a coating. The temperature used in the process is somewhat dependent upon the fluoroorganocopper composition used and whether the "ink" or "solution" process is used. The "ink" process, in general, requires heating at higher temperatures to decompose the fluoroorganocopper composition. For example, below, when the compositions in the left-hand column are used, preferred minimum temperatures for producing bright copper coatings are given in the middle and right-hand columns for the "ink" and "solution" processes:

| Composition | Preferred minimum process temperature (° C.) Solution | Ink |
|---|---|---|
| *m*-$CF_3C_6H_4Cu$ | 25 | 150 |
| *p*-$CF_3C_6H_4Cu$ | 25 | 150 |
| $C_6F_5Cu$ | 175 | 225 |

Various cosolvents can be employed herein but they should be inert to the fluoroorganocopper compositions. These cosolvents include ethers, such as the dimethyl ether of tetraethylene glycol; hydrocarbons, such as *o*-terphenyl and triphenylmethane; tertiary amines, such as pyridine, tributylamine and quinoline; and sulfides, such as butyl sulfide and butyl phenyl sulfide.

The concentration of fluoroorganocopper composition in the solution process can affect the nature of the copper film coating produced. In general, bright, reflective, continuous, electrically conducting copper coatings are produced when highly concentrated fluoroorganocopper solutions are used. Preferably, the solution should contain about 50%, by weight, of the fluoroorganocopper composition, although higher or lower concentrations are operative.

The thickness of the copper coating depends upon the amount of fluoroorganocopper composition employed and upon the surface area being coated. In the solution process, some of the fluoroorganocopper decomposes to give copper powder, therefore, decomposition of the fluoroorganocopper to coating is not quantitative. Thicker coatings can be prepared by repeating the coating procedure on a previously coated substrate. In general, the copper coating has a thickness of about 0.1 micron or higher.

The properties of the copper coating can be improved by annealing, by heating the coated substrate at a temperature in the range of 250° to 600° C. in an inert atmosphere such as in nitrogen, helium and the like. Annealing is only practical for coated substrates which are stable and do not melt at these elevated temperatures.

In general, almost any substrate regardless of shape or form can be copper-coated using the process of this invention. For example, the substrate can include polymers such as polyethylene and polypropylene; polyfluoroethylenes such as polytetrafluoroethylenes and poly(vinyl fluoride); polycarboxamides such as polycaprolactam, poly[hexamethyleneadipamide] and the like; poly[ethylene terephthalate]; polyamides such as poly[oxydiphenylenepyromellitimide]; poly(vinyl chloride) and copolymers thereof; poly(oxymethylene) and copolymers thereof; polyacrylonitrile; poly(methyl methacrylate); poly(ethyl acrylate); poly(vinyl acetate) and copolymers thereof; poly(vinyl alcohol); ethylene copolymers such as ethylene/propylene, ethylene/vinyl acetate, and ethylene/vinyl chloride; polystyrene; polybutadiene; polyisobutylene; polycarbonates such as poly(isopropylidene diphenylene carbonate); and other polymers; ceramics such as glass, quartz, and the like; metals such as aluminum, steel, and the like; cellulosics such as paper, cellulose acetates and the like.

The form of the substrate can be as a shaped object, film, sheet, fiber and the like. The desirability of copper coating a substrate can be for decorative purposes, to produce a catalytic surface, to form an electrically conducting surface such as in a printed circuit or on a fiber to form a protective coating, and to form a surface amenable for adhesion to other substrates or substances.

The copper coatings produced by the above process are good electrical conductors. The copper-coating process can be used for the production of a solid electrical conductor and in particular for the production of printed electrical circuits. The ink process wherein the circuit is coated with the solution, followed by evaporation of the solvent, is the preferred method for coating. The solution can be applied by hand with a suitable brush or stylus or it can be applied from a relief master, as in a conventional letter press printing operation. Additionally, the copper-coating process can be used to copper-coat textile fibers prior to the use of the fiber for the manufacture of articles such as cloth or carpeting. Alternatively, the woven or fabricated article can be copper-coated by the process. One such substrate that can be coated in the form of a fiber or an article is polyacrylonitrile or an acrylonitrile polymer containing small amounts of units derived from comonomers other than acrylonitrile.

THE PREFERRED EMBODIMENTS

The following examples further illustrate the invention. Dioxane referred to in the examples is 1,4-dioxane.

Example 1

Into separate flasks were placed 10 ml. portions of a solution containing approximately 2.3 mmoles of *m*-trifluoromethylphenylcopper in ether-dioxane and one of the following additives: 0.3 g. of 1-hexene, 0.6 g. of 1,1-diphenylethylene, and 50 ml. of petroleum ether, respectively. The flasks containing the above mixtures were allowed to stand at room temperatures. After 1 day, reflective copper coatings were formed on the inner surface of the flasks. The copper coating was scraped from the surface and collected by filtration, rinsed with ether, and analyzed.

The results obtained were:

| Additive | Yield of solid, gram | Analysis percent Cu. |
|---|---|---|
| Hexene | 0.09 | 89.23 |
| 1,1-dipehnylethylene | 0.12 | 75.97 |
| Petroleum ether | 0.07 | 76.17 |

Typical preparative details for the compositions useful herein will be understood from the following description of the preparation of the composition of Example 1. Various other methods for making the useful compositions can be found in U.S. 3,700,693.

To a dry, nitrogen-swept flask was added 0.49 g. (20 mmoles) of magnesium turnings and 20 ml. of anhydrous ether. To this mixture was added 4.50 g. (20 mmoles) of *m*-bromobenzotrifluoride dropwise at a rate to maintain a gentle refluxing. The ethereal solution of *m*-trifluoromethylphenylmagnesium bromide was cooled in an ice-bath and 2.87 g. (20 mmoles) of cuprous bromide was added with stirring. After stirring 4 hours at 0° C., the mixture was diluted with 60 ml. of ether, treated with 4.00 ml. of dioxane giving a precipitate, and filtered, under nitrogen, through a medium sintered-glass filter, giving an ether-dioxane solution of *m*-trifluoromethylphenylcopper.

Fluoroorganocopper-dioxane compositions can be made by employing the above procedure followed by ether evaporation. The dioxane-free fluoroorganocopper compound can be made by placing the fluoroorganocopper-dioxane composition under a vacuum.

Example 2

To a solution of 0.4 g. of *m*-trifluoromethylphenylcopper(I) in ether-dioxane was added 0.28 g. of phenyl ether. The solution was concentrated under a stream of nitrogen at room temperature until the amount of solvent remaining in addition to the phenyl ether was about 0.1 g. Part of the concentrated solution was applied to the inner bottom of a glass vessel in an atmosphere of nitrogen. A stream of nitrogen was passed through the vessel for 5 minutes at 65° C., after which the vessel was closed and heated in an oil bath at 175° C. for 9 minutes. Heating at 175° C. was continued for 6 minutes while a stream of nitrogen was passed through the system, and the vessel was cooled. A smooth copper mirror had formed on the glass surface. The side of the coating in contact with the glass was brighter than the side away from the glass. The electrical resistance of the copper coating, determined with a Simpson Model 260 meter by scratching the coating with two point probes 8 mm. apart, was 0.7 ohm.

The experiments summarized in Table I in which "glass" was the substrate were carried out by essentially the foregoing procedure, with variations as noted. When the substrate was other than glass, a piece of the substrate was placed on the bottom of the vessel. The solution of *m*-trifluoromethylphenylcopper(I) was applied to it (and also, incidentally, to some of the glass surface), excess solution was removed from the substrate with a pipette or syringe, and the remainder of the treatment was carried out as described above, with variations as noted in Table I.

TABLE I.—PREPARATION OF COPPER FILMS FROM META-TRIFLUOROMETHYLPHENYLCOPPER

| Example | Substrate | Coating solution | | | Predrying time and temp. | Baking time and temp. | Postdrying time and temp. | Resistance | Remarks on coating |
|---|---|---|---|---|---|---|---|---|---|
| | | $m\text{-}CF_3C_6H_4Cu$ | Ether dioxane | Other | | | | | |
| 3 | Glass | 0.4 g | 0.5 | Tetraglyme, 0.50 g. | 10 min./25–75° C | 6 min./175° C | 5 min./175° C | 2.2 | Dull coppery solid. Few cracks or holes. |
| 4 | do | 0.4 g | 0.4 g | O-terphenyl, 0.25 g. | 10 min./25–75° C | 12 min./175° C | | 170 thin, 3,000 thick. | Dark, metallic, smooth, shiny residue. |
| 5 | Mylar®1 | 1.6 g | 0.7 g | $C_6H_5OC_6H_5$, 1.00 g. | 5 min./25° C | 15 min./175° C | | 8 | Largely dark, cracked, porous, Small section was bright, rough, coppery. |
| 6 | Glass | 0.4 g | | Pyridine, 0.16 g | | 5 min./175° C | | 4 | Light-colored copper deposits. |
| 7 | Mylar®1 | Yes | Yes | | Yes | 10 min./175° C | | Conducts | Coating did not rub off, did not tear off with adhesive tape. |
| 8 | Teflon®1 FEP film 2 (2 mil.) | Yes | Yes | | Yes | 10 min./175° C | | do | |
| 9 | Fiber glass thread | Yes | Yes | | Yes | 10 min./175° C | | do | |
| 10 | Nylon 3 thread | Yes | Yes | | Yes | 10 min./175° C | | Barely conducts. | |
| 11 | Delrin®4 pressed film | Yes | Yes | | | 10 min./180° C | Yes | Conducts | Adhered well. |
| 12 | Nylon 3 film | Yes | Yes | | | 10 min./180° C | Yes | do | Do. |
| 13 | Aluminum foil | Yes | Yes | | | 10 min./180° C | Yes | do | Adhered well to half of the foil. |
| 14 | Paper | Yes | Yes | | | 10 min./180° C | Yes | do | Coated twice. |
| 15 | Polyimide 5 | Yes | Yes | | | 10 min./180° C | Yes | | Light color, shiny. |

1 Poly(ethylene terephthalate).
2 Tetrafluoroethylene/hexafluoroethylene copolymer.
3 Poly(hexamethyleneadipamide).
4 Poly(oxymethylene).
5 Poly(4,4'-oxydiphenylenepyromellitimide).

Example 16

A solution of *m*-trifluoromethylphenylcopper in fluorotrichloromethane was placed in a glass vessel and allowed to stand at room temperature. Within 30 minutes, a reflective copper coating, e.g., a copper mirror, was deposited on the inner surface of the vessel.

Example 17

An ether-dioxane solution concentrate of *m*-fluorophenylcopper in a glass vessel, made from *m*-fluorophenylmagnesium bromide and cuprous bromide, deposited a copper mirror coating on the inner surface of the glass vessel over a period of three days at room temperature.

Example 18

An ether-dioxane solution of *p*-fluorophenylcopper, made from *p*-fluorophenylmagnesium bromide and cuprous bromide, was placed in a glass vessel and allowed to stand at room temperature over a period of three days. A copper mirror coating was deposited on the inner surface of the glass vessel.

Example 19

A 5.0-g. sample of finish-free acrylonitrile/methyl acrylate/sodium p-styrenesulfonate (93.8/6/0.2) copolymer staple, 1½ inch cut length, was placed in a 200-ml. flask, dried under vacuum of 0.1 mm. for 2 hours, placed under 1 atmosphere of pure nitrogen, covered with 100 ml. of ether and 100 ml. of an ether-dioxane solution containing about 40 mmoles of *m*-trifluoromethylphenylcopper, and stored for 4 days at room temperature. The mixture was suction filtered. The coated staple was liberally rinsed with ether and air-dried giving 7.5 g. of bright, light coppery-colored material.

The electrical resistance of the bulk material between two point probes separated by 8 mm. was less than 0.2 ohms. Color photographs at 120X showed a smooth copper coating. Electron microscope pictures of fiber cross sections showed a 0.20 to 0.25 micron coating that closely follows the irregular contour of the fiber with occasional gaps.

The coated fiber was blended with uncoated fiber, woven into fabric, and tested for antistatic behavior before and after washing. A fabric containing 1% of coated fiber analyzed for 0.22 and 0.21% copper and had moderate antistatic protection. After 10 washings, it analyzed for 0.22 and 0.21% copper and still had moderate antistatic protection.

Example 20

Substrates described below were immersed in 1220 ml. of about 60:1 ether-dioxane solution containing approximately 0.18 *m*-trifluoromethylphenylcopper. The mixture was allowed to stand for 5 days at room temperature, then the solution was decanted and the substrates rinsed with ether and air-dried. The substrates were coated with conductive layers of copper. Loose pieces of copper were collected and analyzed to be 96.04% copper.

The copper coating on a piece of molded polyhexaethyleneadipamide was removed with an air jet. The coating on a piece of molded, acid-etched polyhexamethyleneadipamide was not removed by an air jet and had a resistance of 10 to 15 ohms between point probes 8 mm. apart.

The coating on a tablet of molded, acid-etched polyformaldehyde (20% glass filled) was not removed by an air jet and conducted very well near the bottom end. The coating on a tablet of molded polyformaldehyde was largely removed by an air jet. The coatings on ⅛ x 1½ x 2½ inch pieces of molded, acid-etched polyformaldehyde were not removed by an air jet, and conducted fairly well.

The coating on alumina wafers was not removed by an air jet and was an excellent conductor.

The embodiments of the invention in which an exclusive property or privilege is claimed are defined as follows:

1. A process for coating a substrate with metallic copper comprising contacting the substrate at a temperature between about −20° to 350° C. with a member selected from the group consisting of fluoroorganocopper compositions of the formula $$(R_f\text{—}Cu)_x\cdot(\text{dioxane})_y$$

wherein $R_f$ is a fluorinated monovalent hydrocarbyl radical containing up to 12 carbons selected from the group consisting of

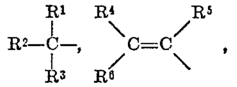

and Ar— wherein $R^1$ and $R^2$ can be the same or different and are selected from the group consisting of hydrogen, perfluoroalkyl, fluoroaryl and (perfluoroalkyl) aryl;

$R^3$ is selected from the group consisting of hydrogen, perfluoroalkyl, fluoroaryl, (perfluoroalkyl)aryl and carbalkoxy provided at least one of $R^1$, $R^2$ and $R^3$ contains fluorine;

$R^4$, $R^5$ and $R^6$ can be the same or different and are fluoroalkyl;

Ar is selected from the group consisting of fluoroaryl, (fluoroalkyl)aryl, and (perfluoroalkoxy) aryl;

x is an integer from 1 to 4; and
y is 0, ½, 1, 2 or 3, and solutions of said fluoroorganocopper compositions in an inert, aprotic solvent; said compositions having an atomic ratio of fluorine to copper of at least 1:1.

2. The process of claim 1, wherein the fluoroorganocopper composition is in solution in an inert, aprotic solvent.

3. The process of claim 1, wherein the temperature is maintained between about 10° C. to 225° C.

4. The process of claim 1, wherein the substrate is ceramic.

5. The process of claim 1, wherein the substrate is metal.

6. The process of claim 1, wherein the substrate is cellulosic.

7. The process of claim 1, wherein the substrate is a polymer.

8. The process of claim 7, wherein the substrate is an acrylonitrile polymer.

References Cited

UNITED STATES PATENTS 3,438,805 4/1969 Potrafke ------ 117—138.8 R X

EDWARD G. WHITBY, Primary Examiner

U.S. Cl. X.R.

117—130 R, 107.2 R, 138.8 R, 138.8 VA, 152, 160 R; 260—438.1